(12) United States Patent
Oki

(10) Patent No.: US 7,685,018 B2
(45) Date of Patent: Mar. 23, 2010

(54) METHOD AND SYSTEM FOR PROVIDING A PAYBACK TO A USER AND DISTRIBUTOR BASED ON PRODUCT USE

(75) Inventor: Hiroshi Oki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1122 days.

(21) Appl. No.: 09/883,913

(22) Filed: Jun. 20, 2001

(65) Prior Publication Data

US 2001/0044746 A1 Nov. 22, 2001

Related U.S. Application Data

(63) Continuation of application No. PCT/JP00/00012, filed on Jan. 5, 2000.

(30) Foreign Application Priority Data

Jan. 5, 1999 (JP) ............................. 11-000425

(51) Int. Cl.
*G06Q 30/00* (2006.01)
*G06F 21/00* (2006.01)

(52) U.S. Cl. ................. 705/14.31; 705/51; 705/54; 705/14.32; 705/14.33; 705/14.27; 705/14.19

(58) Field of Classification Search ............... 705/14, 705/1, 26, 51, 54, 14.31, 14.32, 14.33, 14.19, 705/14.27
See application file for complete search history.

(56) References Cited

U.S. PATENT DOCUMENTS

| | | | | |
|---|---|---|---|---|
| 4,827,508 A | * | 5/1989 | Shear | 705/53 |
| 5,537,314 A | * | 7/1996 | Kanter | 705/14 |
| 5,634,012 A | | 5/1997 | Stefik et al. | |
| 5,903,875 A | | 5/1999 | Kohara | |
| 6,029,141 A | * | 2/2000 | Bezos et al. | 705/27 |
| 6,049,789 A | * | 4/2000 | Frison et al. | 705/59 |
| 6,134,533 A | * | 10/2000 | Shell | 705/26 |
| 6,148,332 A | * | 11/2000 | Brewer et al. | 709/218 |
| 6,185,683 B1 | * | 2/2001 | Ginter et al. | 713/176 |
| 6,237,039 B1 | * | 5/2001 | Perlman | 709/237 |
| 6,269,395 B1 | * | 7/2001 | Blatherwick et al. | 709/219 |
| 6,363,356 B1 | * | 3/2002 | Horstmann | 705/26 |
| 6,377,936 B1 | * | 4/2002 | Henrick et al. | 705/14 |
| 6,418,421 B1 | * | 7/2002 | Hurtado et al. | 705/54 |
| 6,442,529 B1 | * | 8/2002 | Krishan et al. | 705/14 |

(Continued)

FOREIGN PATENT DOCUMENTS

JP 6-295390 10/1994

(Continued)

OTHER PUBLICATIONS

"Advertising: Ad Notes", Wall Street Journal, col. 3, p. 5, Sec. B: Friday Sep. 4 1998.*

(Continued)

*Primary Examiner*—Jean Janvier

(57) ABSTRACT

The present invention relates to a payback system and a payback method for calculating a payback value to a customer receiving a service by using a product provided (for free or payment) from a product manufacturer or a middleman, or to the middleman. The payback value is calculated based on the use results of the service (including a service on a network) by a product user.

7 Claims, 6 Drawing Sheets

U.S. PATENT DOCUMENTS

| | | | |
|---|---|---|---|
| 6,519,700 B1 * | 2/2003 | Ram et al. | 713/193 |
| 7,120,604 B2 | 10/2006 | Maari | |
| 2001/0025253 A1 * | 9/2001 | Heintz et al. | 705/14 |
| 2004/0073451 A1 | 4/2004 | Maari | |

FOREIGN PATENT DOCUMENTS

| | | |
|---|---|---|
| JP | 9-503322 | 3/1997 |
| JP | 9-161150 | 6/1997 |
| JP | 09-319573 | 12/1997 |
| JP | 10-051573 | 2/1998 |
| JP | 10-105626 | 4/1998 |
| WO | 95-08231 | 3/1995 |
| WO | WO 9636926 A1 * | 11/1996 |

OTHER PUBLICATIONS

Partial Translation of Nikkei Communications, No. 1995.1.2 (Japan), Kabushiki Kaisha Nikkei BP, (Feb. 1, 1995), pp. 64-69.

Partial Translation of Nikkei Windows NT, No. 21, (Japan), Kabushiki Kaisha Nikkei BP, (Dec. 1998) pp. 34-37.

Japanese Office Action mailed on Jul. 21, 2009 and issued in corresponding Japanese Patent Application 2000-592764 (2 page) (2 pages English Translation).

* cited by examiner

FIG.4

| TERMINAL SERIAL NO. | TERMINAL DISTRIBUTOR ID |
|---|---|
| A A A 0 0 1 | D 0 0 1 |
| A A A 0 0 2 | D 0 0 2 |
| A A A 0 0 3 | D 0 0 3 |
| A A A 0 0 4 | D 0 0 1 |
| A A A 0 0 5 | D 0 0 5 |
| B B B 0 0 1 ~ B B B 0 9 9 | D 0 1 0 |

FIG.5

| USER ID | TERMINAL SERIAL NO. |
|---|---|
| X X X 0 0 1 | A A A 0 0 1 |
| X X X 0 0 2 | B B B 0 0 2 |
| X X X 0 0 3 | B B B 0 5 0 |
| X X X 0 0 4 | A A A 0 0 3 |
| X X X 0 0 5 | A A A 0 0 2 |

FIG.6

| USER ID | REGISTRATION DATE | CUMULATIVE USE RESULTS |
|---|---|---|
| X X X 0 0 1 | 1 9 9 7 0 1 2 0 | 1 2, 0 0 0 |
| X X X 0 0 2 | - - | |
| X X X 0 0 4 | 1 9 9 8 1 1 1 0 | 5, 0 0 0 |
| X X X 0 0 5 | 1 9 9 8 0 1 3 0 | 1 0, 0 0 0 |

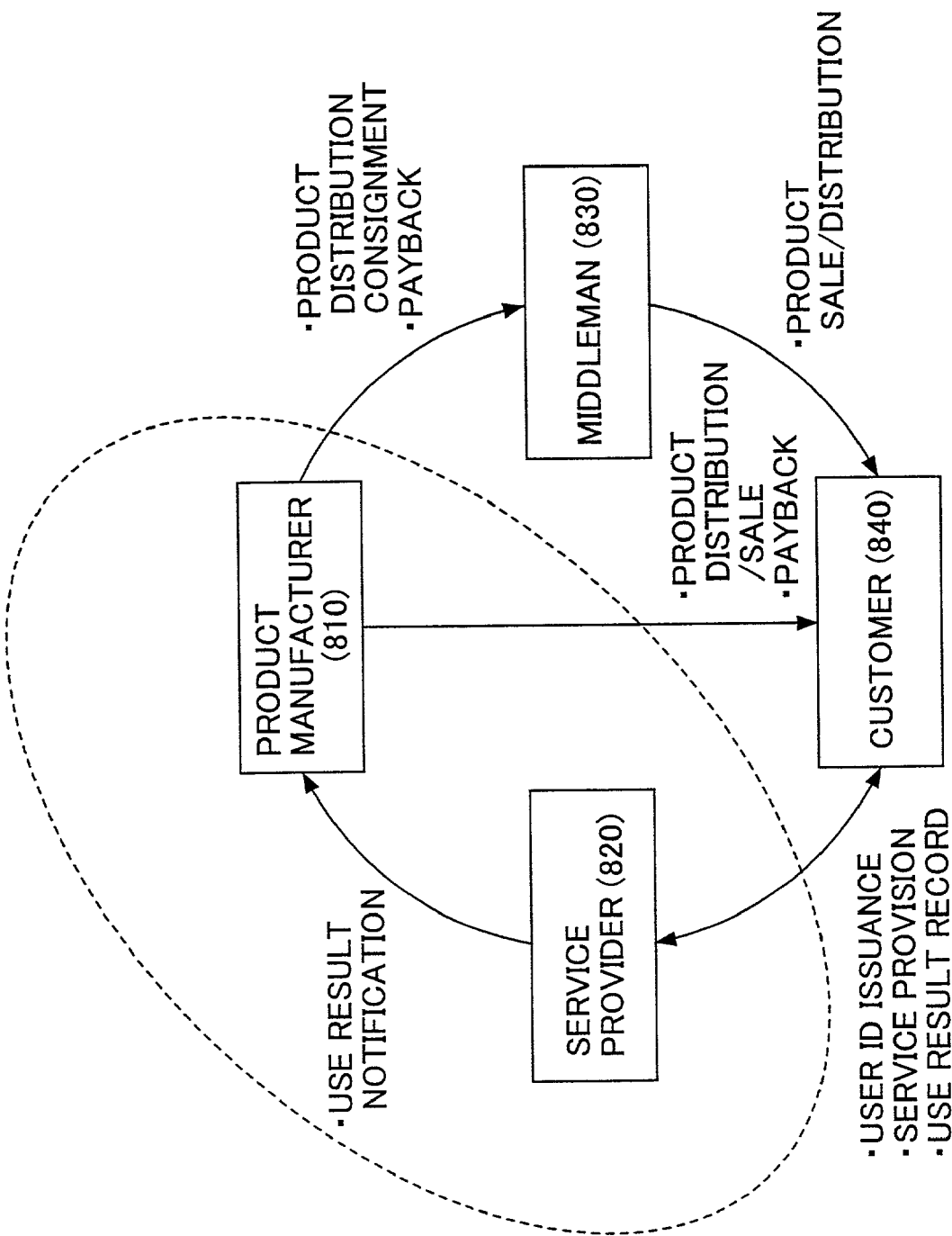

METHOD AND SYSTEM FOR PROVIDING A PAYBACK TO A USER AND DISTRIBUTOR BASED ON PRODUCT USE

This application is a continuing application filed under 35 U.S.C. §111(a), based upon International Application PCT/JP00/00012, filed Jan. 5, 2000, it being further noted that priority is based upon Japanese Patent Application 11-000425, filed Jan. 5, 1999.

TECHNICAL FIELD

The present invention relates to payback systems and payback methods for payback to customers receiving services by using products or to middlemen in cases where the products are provided for or without payment by product manufacturers or the middlemen. In this specification, the services include network services. The products include, for instance, products for information processing (personal computers, portable telephones, PDAs, hardware products such as set-top boxes, software, and software products such as recording media storing software).

BACKGROUND ART

At present, a variety of network services are provided for payment by systems consisting of servers and clients. Some of these pay network services perform service management with machine IDs (terminal IDs) and user IDs, and provide a variety of services for payment via networks by charging user IDs registered in specific machines. Others provide services by charging user IDs registered in specific users' machines such as personal computers in which given special terminal software is installed.

A client (a terminal or terminal software) is sold with a product warranty. The purpose of the warranty is, as its name implies, to provide a guarantee if something is wrong with a product. In addition to a conventional warranty in the form of a paper card that comes with a product, an electronic warranty has been proposed. For instance, Japanese Laid-Open Patent Application No. 10-105626 (An electronic warranty issuance and management method and system) discloses a method of electronically sharing information related to the warranty of a sold product among the manufacturer, distributor, and purchaser of the product.

Generally, in network services, it is a key to the improvement of business performance for a server to obtain many clients and have the clients use many network services. For that purpose, first of all, a large amount of attractive information should be provided, and it is necessary to obtain a large number of unspecified users on networks.

On the other hand, each user needs a special client in terms of hardware and software for information transmission to and reception from the server, so that the clients are expected to be distributed and spread effectively among the users.

Therefore, in the network services, there is a general tendency to sell the clients at lower prices, and in some cases, special terminal software used in personal computers, which can be provided on-line via networks, is distributed free. That is, income from the network services does not depend on income from the sales of the clients that are tools for connection, but the network services profit by having their menus used. Accordingly, in many cases, the server can expect an income from its services continuously for a long period of time.

For the above-described reason, payback is often provided to client distributors, who distribute clients for free or at low prices, as an incentive to sales network expansion and client distribution. Conventionally, the payback has been made only by an easy method such as a distributor's own request. For instance, a distributor has been paid back a certain commission on the sales of one client.

However, the problem has been an effective means of realizing mass distribution and sales of clients as a means of obtaining more customers and promotion of using more network services continuously for a long period of time, and a solution to the problem has been sought.

DISCLOSURE OF THE INVENTION

In consideration of the above-described point, the present invention has an object of providing a payback method that provides distributors of products for free or payment with an incentive to product distribution and utilization support.

Another object of the present invention is to provide payback means to pay back customers receiving products for free or payment.

The above objects of the present invention are achieved by a payback system having a below-described structure.

FIG. 1 is a diagram of a payback system for payback to a terminal distributor in a network service provided for payment to each customer through a distributed terminal, in which the numeral 1 represents distribution channel storage means for storing the terminal distributor of a terminal with the terminal distributor being correlated with terminal identification information for identifying the terminal, the numeral 2 represents terminal information storage means for storing customer identification information for identifying the customer and the terminal identification information registered with a network service provider by the customer with the customer identification information being correlated with the terminal identification information. The numeral 4 represents payback calculation means for calculating a payback value to be paid to the terminal distributor by the network service provider based on the customer identification information stored in the terminal information storage means 2 so as to be correlated with the terminal identification information stored in the distribution channel storage means 1 and on network service use result information 3 separately collected and correlated with the customer identification information

BRIEF DESCRIPTION OF THE DRAWINGS

A description will be given below, with reference to the accompanying drawings, of the present invention.

FIG. 4 is a diagram of a structure of a distribution channel information file;

FIG. 5 is a diagram of a structure of a terminal information file;

FIG. 6 is a diagram of a structure of a use result information file;

FIG. 8 is a diagram of a structure of another mode for carrying out the present invention.

BEST MODE FOR CARRYING OUT THE INVENTION

Figure 1:
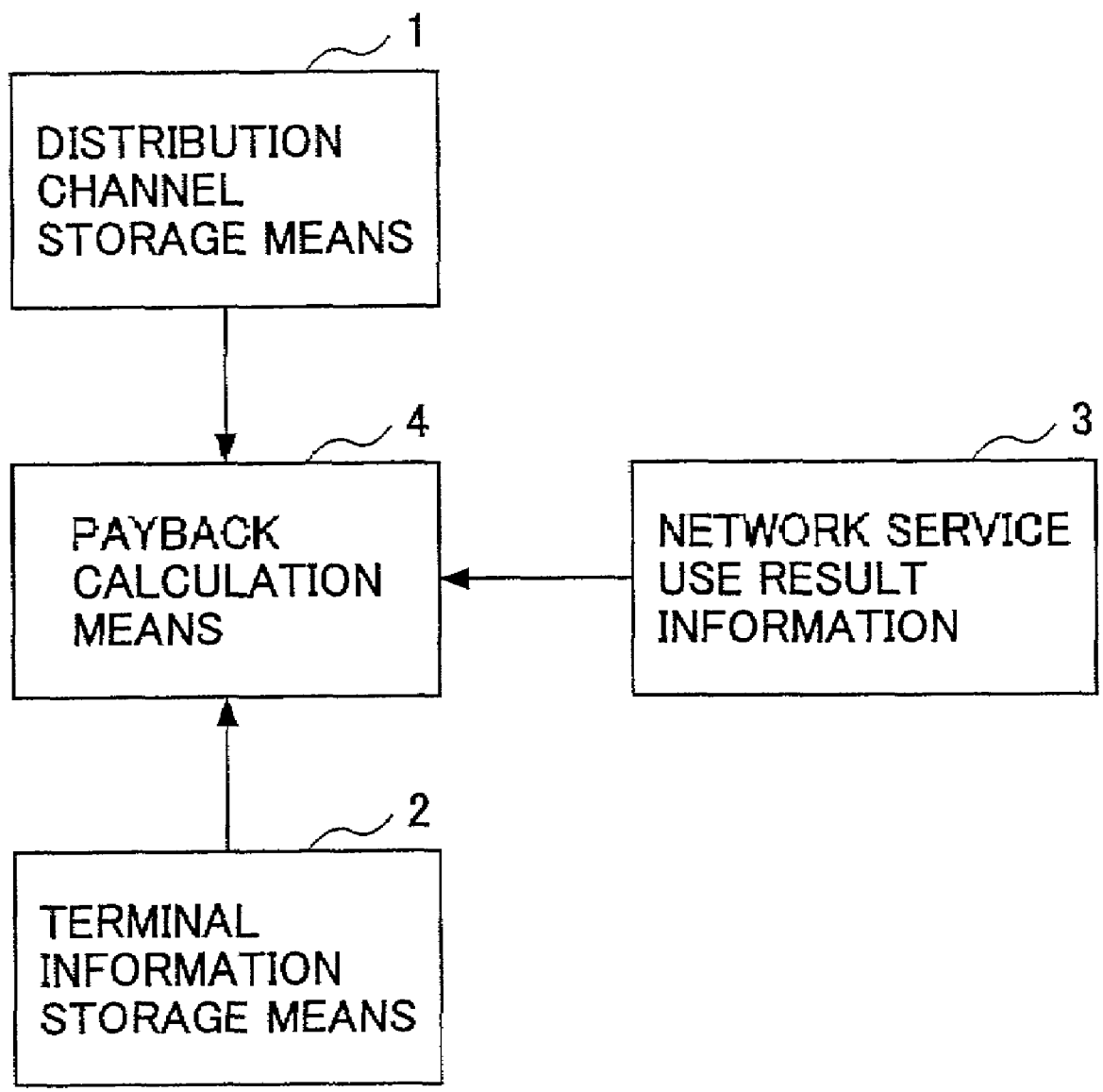
FIG. 1 is a diagram of a structure of the present invention.
Figure 2:
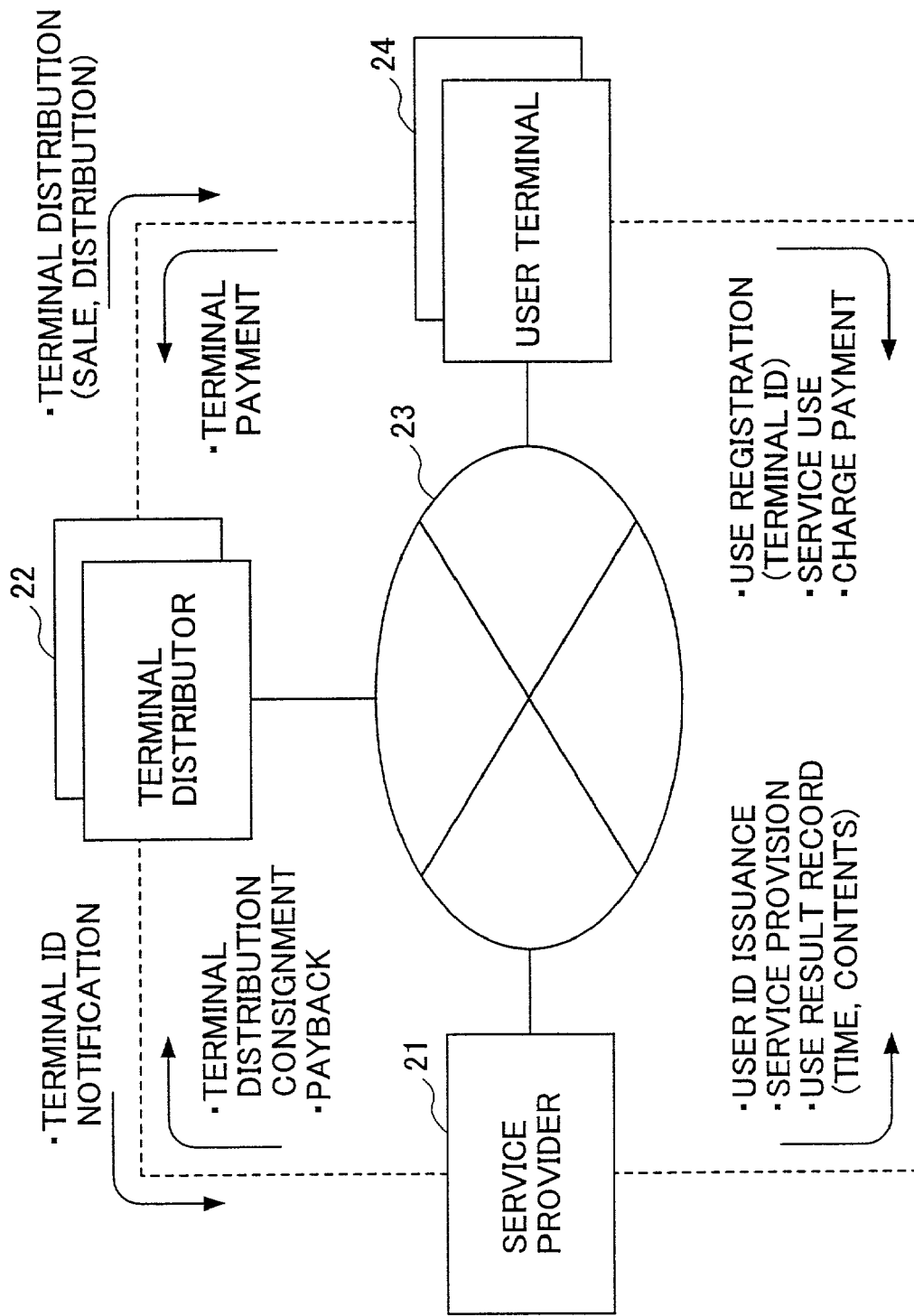
FIG. 2 is a diagram for illustrating a mode for carrying out the present invention.

FIG. 2 is a diagram for illustrating a mode for carrying out the present invention. The numeral 21 represents a service provider of a network service, the numeral 22 a terminal distributor, the numeral 24 a user terminal, and the numeral 23 a network connecting them. A description will be given below of their relations in the network service.

The service provider 21 consigns the distribution of terminals to the terminal distributor 22. Each terminal, if hardware (product), can be identified by a production number or a serial number assigned thereto at the time of shipment. If the terminals to be distributed are software, the terminals are provided in the form of CD-ROMs each storing a program functioning in a personal computer, or are provided on-line on the network. Each provided unit is indicated by a serial number. Here, a serial number is taken as a terminal ID so that both hardware and software terminals can be treated.

The terminal distributor 22 sells or distributes hardware terminals such as set-top boxes or electronic media recorded with software, such as CD-ROMs, to users over the counter. With respect to a product for payment, the terminal distributor 22 issues a warranty recorded with a terminal serial number and user information at the time of sale as a guarantee on the product, and hands the warranty to a user and notifies the service provider 21 who has asked for the distribution. Free terminal software is never distributed with a warranty, but the service provider 21 is notified of a distributed terminal ID, or a serial number assigned to the medium, together with user information. Thereby, the service provider 21 can be informed of the terminal ID (serial number) of a terminal distributed by the terminal distributor 22.

Next, the user who has obtained the terminal presents the terminal serial number and other user information and obtains a user ID issued by the service provider 21 at the first connection with the service provider 21 through the network. At this time, in order to record network service use results, the service provider 21 can record the serial number that is the terminal ID and the user ID as correlated data.

Thereafter, the user can access the service provider 21 from the user terminal 24 to receive the network service. The service provider 21 can collect a user charge based on the use results from the user terminal 24, that is, based on a connection fee and used functions.

Based on the above-described use results, a payback is made to the terminal distributor 22 in accordance with a contribution to an income obtained from the network service business. That is, the payback is made to the terminal distributor 22 based on the terminal ID of the user terminal 24.

The effects of the present invention can be produced whether the software is provided on-line with the same serial number or with a representative number replacing the serial number so that the terminal distributor 22 of the software can be specified.

A description will be given below of a payback calculation means of a payback system at a time of providing the network service.

Figure 3:
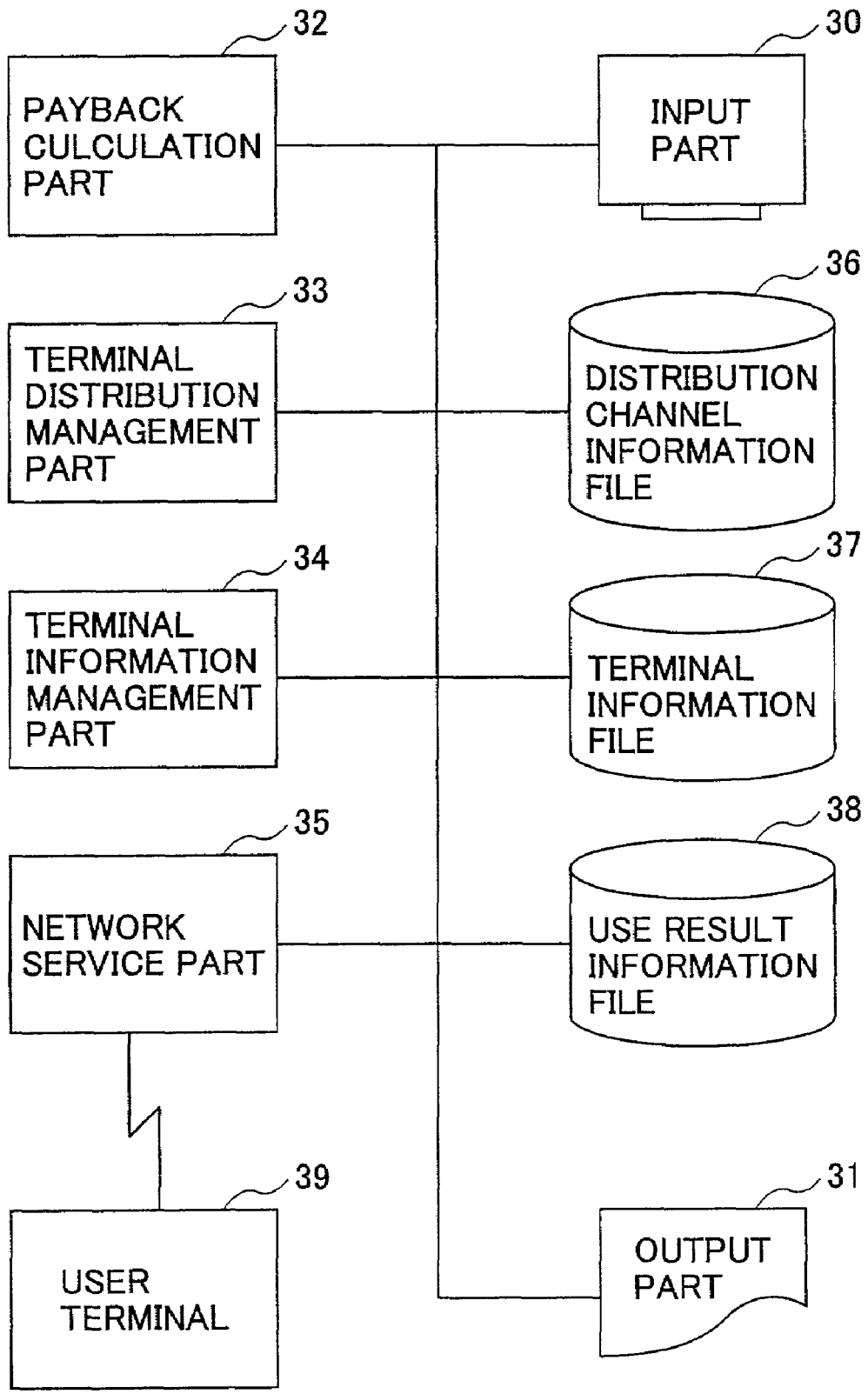
FIG. 3 is a diagram for illustrating the mode for carrying out the present invention.

FIG. 3 is a diagram showing a structure of the mode for carrying out the present invention.

This mode is realized by a computer program executed in a multi-purpose computer such as a personal computer or a workstation.

The network service payback system of the present invention is realized by executing a computer program in a computer including a processor, a main storage, an auxiliary storage, and an input-output unit. The provided computer program is stored in a portable medium such as a floppy disk or a CR-ROM, or in the main storage or auxiliary storage of another computer connected to the network. A recording medium of the present invention corresponds to the above-described portable medium, main storage, or auxiliary storage.

The provided computer program, before being executed, is loaded into the main storage of the computer directly or after being temporarily copied to or installed in the auxiliary storage from the portable medium. In the case of being provided from a storage of another apparatus connected to the network, the computer program is copied to the auxiliary storage and loaded into the main storage to be executed after being received from the apparatus by way of the network.

In FIG. 3, a terminal distribution management part 33 predetermines a terminal distributor of each terminal based on its serial number before the distribution of the terminals, or matches a terminal distributor with the serial number of a terminal on receiving a returned warranty at a time of selling the terminal. The terminal distribution management part 33 sets this correspondence input from an input part 30 in a distribution channel information file 36.

A terminal information management part 34 correlates the serial number of the terminal with a user ID issued by a network service part 35 to set the serial number and the user ID in a terminal information file 37 in the first user registration made by a user obtained the terminal to receive the network service.

The network service part 35 provides the network service to a user terminal 39 and records network service use results from the user terminal in a use result information file 38.

A payback calculation part 32 calculates payback to be made to the terminal distributor of the terminal based on the information stored in the above-described distribution channel information file 36, terminal information file 37, and use information file 38.

A description will be given below of the stored state of each file and a payback calculation operation based on the files.

FIG. 4 shows a structure of the distribution channel information file 36, in which each terminal serial number is correlated with a corresponding terminal distributor ID. Like AAA001 through AAA005, the contents of the copies of the warranties of hardware terminals which copies terminal distributors present to a service provider as sales evidence are registered, or, like BBB001 through BBB099, the service provider consigns the distribution of terminal software collectively to a terminal distributor. Therefore, when a terminal ID (serial number) is given, the distributor of a corresponding terminal can be found out by searching the distribution channel information file 36.

FIG. 5 shows a structure of the terminal information file 37. When a user makes user registration to receive the network service, the user sends a terminal serial number as the ID of an obtained terminal to the service provider by way of on-line conversation. As a result of this registration, a user ID is provided to the user. When the user ID is provided, the serial number of the user terminal can be found out by searching the terminal information file with the key of the user ID.

FIG. 6 is a diagram of a structure of the use result information file 38. When the network service is received, a period of use and used functions are recorded, and a user charge is calculated by the given period or the user ID based on the period of use and the used functions to be stored in the use result information file 38, being correlated with the user ID. The date of user registration is also recorded as a registration date.

Figure 7:
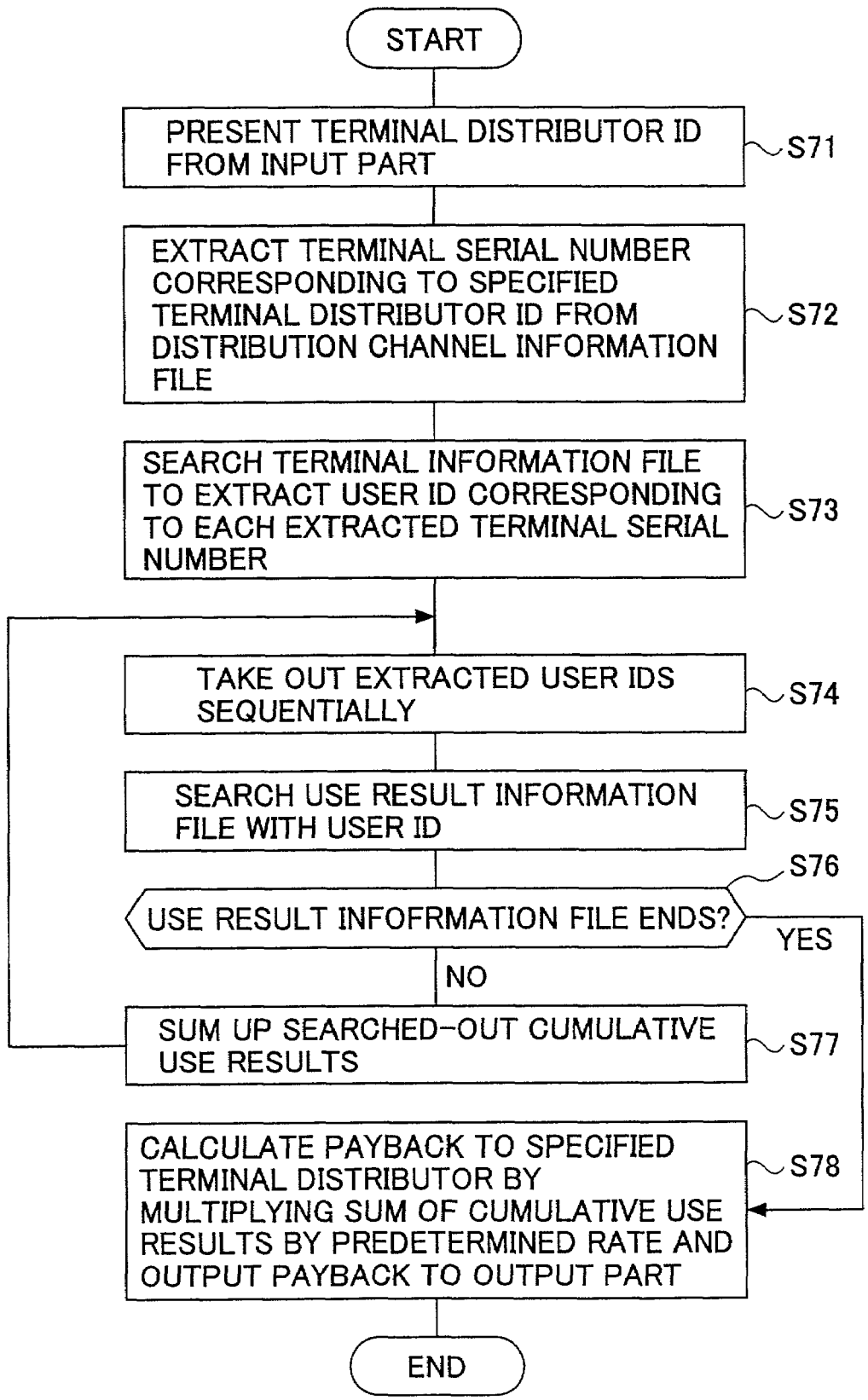
FIG. 7 is a flowchart of an operation of a payback calculation part.

FIG. 7 shows a flowchart of an operation of the payback calculation part 32. Shown herein is a payback calculation operation with respect to one terminal distributor. That is, a description will be given of an operation of outputting the calculation result of payback corresponding to a terminal distributor ID indicated from the input part 30.

In step S71, the ID of a terminal distributor to which payback is made is input form the input part 30.

In step S72, by searching the distribution channel information file 36 with the key of the specified terminal distributor ID, corresponding serial numbers, that is, all the terminals distributed by the specified terminal distributor, are searched out to be stored temporarily.

In step S73, the terminal information file 37 is searched for user IDs corresponding to the temporarily stored terminal serial numbers, and the user IDs are temporarily stored. The user IDs extracted herein represent users who have used the network service by means of the terminals distributed by the previously specified terminal distributor.

In steps S74 through S77, the results of use by each of the above-described extracted users are accumulated and summed up. If it is determined in step S76 that the summing of the use results of all the extracted user IDs is completed, in step S78, the payback is calculated by multiplying the sum of the network service use results by a predetermined rate to be output to an output part 31.

FIG. 8 is a diagram of a structure of another mode for implementing the present invention. In this embodiment, a service provider 820 has organizational or economic relations (for instance, parent-and-affiliated-company relations or cooperative business relations on a contract basis) to a product manufacturer 810. The service provider 820 includes a service provider in the real world in addition to a network service provider (for instance, an ISP).

In FIG. 8, there are two product distribution routes. In the first product distribution route, the product manufacturer 810 consigns the distribution of products to a middleman 830. The middleman 830 distributes a product for free or payment to a customer 840. In the second product distribution route, the product manufacturer 810 distributes a product for free or payment to the customer 840. The product manufacturer 810 and the middleman 830 may collectively be referred to as a product provider.

The customer 840, by using the product, receives a service provided by the service provider 820. The service provider 820 issues a user ID to the customer 840 at a time of providing the service. The service provider 820 records the service use results of the customer 840 by using the product, and manages the results.

The service provider 820 manages the service use results by correlating the service use results with a payback recipient (the middleman 830 in the first product distribution route, and the customer 840 in the second product distribution route. The same applies hereinafter). In the above-described embodiments (FIGS. 4 through 6), the use results are managed by being correlated via the user ID and the terminal serial number with the payback recipient (the terminal distribution ID). In the second product distribution route, that is, in the case of paying back the customer 840, the distribution channel information file 36 (of FIG. 3) may be omitted.

The use results include, for instance, a period of service use and a connection fee for service use. The use results may be altered based on a service use hour. If a plurality of services are provided, the use results may be altered with respect to each service based on its type, attribute, and grade.

The service provider 820 notifies the product manufacturer 810 of the use results together with information for specifying a payback recipient every time a certain period of time (for instance, a day, a month, or three months) passes or the customer 840 ends the use of the service. In this case, the product manufacturer 810 calculates a payback value to the payback recipient based on the use results.

In this case, the distribution channel information file 36, the terminal information file 37, the network service part 35, the terminal distribution management part 33, and the terminal information management part 34 of FIG. 3 are included in the system of the service provider 820, but the payback calculation part 32 is included in the system of the product manufacturer 810. The use result information file 38 is included in the system of the service provider 820 if the notification of the use results is provided at regular intervals, and may be included in the system of the product manufacturer 810 if the notification is provided every time a user ends the use of the service.

In another implementation mode, the service provider 820 calculates a payback value to each payback recipient. In this case, the service provider 820 notifies the product manufacturer 810 of the payback recipient and the payback value. The payback value may be the amount of money to be paid back or points to be paid back (if collected points exceeds or equals a certain amount, the payback recipient receives a certain economic merit).

In this case, the distribution channel information file 36, the terminal information file 37, the user result information file 38, the network service part 35, the terminal distribution management part 33, the terminal information management part 34, and the payback calculation part 32 of FIG. 3 are included in the system of the service provider 820.

Further, in the above-described case, the payback is made either to the customer 840 or to the middleman 830. However, in the first product distribution route, the payback may be made to both customer 840 and middleman 830.

In another implementation mode, the product manufacturer 810 and the service provider 820 can be the same corporation.

In another implementation mode, the product manufacturer 810 can be replaced by a service provider (different from the service provider 820). In this case, the product is not distributed, but a service is provided to the customer 840. The product manufacturer 810 and the service provider 820 can be the same corporation also in this case.

Here, the paid amount of a user charge is employed as the use results. However, the payback may be calculated based on a registration period continuing from user registration up to the present. Although the predetermined rate is employed for calculation, another function (for instance, a function based on a service type or attribute, or a function based on a service use hour) or logic can be employed for the evaluation of the payback value. Further, the payback may be calculated only by evaluating the fact that user registration is made at a time of calculating the payback, that is, the payback may be calculated based only on the number of users.

As is apparent from the above description, according to the present invention, the payback can be made in accordance with a contribution to an income from a service business (including a network service business) which contribution is made by obtaining users by distributing products, thus producing an industrial effect that terminal distributors are provided with an incentive to sales network expansion for increasing users of services (including network services) and the services provided by the terminal distributors are vitalized so as to contribute to the development of computerized society.

The invention claimed is:

1. A payback system in which a customer receives a product directly or via a middleman from a product provider or a product and service provider, and receives a service from a service provider or the product and service provider by using the product, characterized by:
   recording means for recording a use of services received from the product by the customer;
   storage means for storing use results of the recorded services received by the customer by using the product; and
   determination means for determining, based on the stored recorded use results related to the product, a payback value or payback values to both the customer and the middleman.

2. The payback system as claimed in claim 1, characterized in that:
   the product is an information-processing product; and
   the service is provided by means of the information-processing product.

3. A payback system for making payback to both a product user and a middleman when a service is received by using a product distributed by a product manufacturer or the middleman, characterized by:
   a storage device storing use result information of the service received by the product user by using the product; and
   a calculation device calculating a payback value or payback values to both the product user and the middleman based on the stored use result information stored in said storage device.

4. The payback system as claimed in claim 3, characterized in that:
   the product is an information-processing product; and
   the service is provided by means of the information-processing product.

5. A payback system in which a customer receives a product directly or via a middleman from a product provider or a product and service provider, and receives a service from a service provider or the product and service provider by using the product, characterized by:
   a storage device storing use result information of the service received by the customer by using the product; and
   a determination device determining a payback value or payback values of the product to both the customer and the middleman based on the stored use result information stored in said storage device.

6. The payback system as claimed in claim 5, characterized in that:
   the product is an information-processing product; and
   the service is provided by means of the information-processing product.

7. A payback system for making payback to a customer and a middleman when a service is received by using a product distributed by a product distributor such as a manufacturer or the middleman, comprising:
   distribution channel storage means for storing information correlating the distributed product by the product distributor to the customer;
   product usage storage means for storing information about the customer's use of the product; and
   calculation means for calculating a payback value or payback values to the customer and the middleman based on the stored information about the customer's use of the product.

* * * * *